(12) United States Patent
Tanaka et al.

(10) Patent No.: US 10,202,140 B2
(45) Date of Patent: Feb. 12, 2019

(54) PIN ASSEMBLY AND STEERING DEVICE

(71) Applicants: JTEKT CORPORATION, Osaka-shi, Osaka (JP); TOYOTA JIDOSHA KABUSHIKI KAISHA, Toyota-shi, Aichi (JP); DAIWA PLASTICS CO., LTD., Sakai, Osaka (JP)

(72) Inventors: Eiji Tanaka, Kitakatsuragi-gun (JP); Susumu Imagaki, Tondabayashi (JP); Hiroyuki Yao, Kashihara (JP); Kenji Imamura, Kosai (JP); Kentaro Okuno, Sakai (JP); Eiji Hayashi, Sakai (JP)

(73) Assignees: JTEKT CORPORATION, Osaka-shi (JP); TOYOTA JIDOSHA KABUSHIKI KAISHA, Toyota (JP); DAIWA PLASTICS CO., LTD., Sakai (JP)

( * ) Notice: Subject to any disclaimer, the term of this patent is extended or adjusted under 35 U.S.C. 154(b) by 0 days.

(21) Appl. No.: 15/104,582

(22) PCT Filed: Dec. 25, 2014

(86) PCT No.: PCT/JP2014/084213
§ 371 (c)(1),
(2) Date: Jun. 15, 2016

(87) PCT Pub. No.: WO2015/098997
PCT Pub. Date: Jul. 2, 2015

(65) Prior Publication Data
US 2016/0332657 A1    Nov. 17, 2016

(30) Foreign Application Priority Data
Dec. 26, 2013   (JP) .................................. 2013-269516

(51) Int. Cl.
*B62D 1/19*    (2006.01)

(52) U.S. Cl.
CPC ............. *B62D 1/195* (2013.01); *B62D 1/192* (2013.01); *Y10T 403/11* (2015.01)

(58) Field of Classification Search
CPC ............. Y10T 403/11; Y10T 403/3906; Y10T 403/645; Y10T 403/7123; B62D 1/192; (Continued)

(56) References Cited

U.S. PATENT DOCUMENTS 2,366,965 A  *  1/1945  Johnson ............ F16L 319/1045
                                                16/386
2,424,602 A  *  7/1947  De Swart ............ F16B 19/1081
                                                248/239

(Continued)

FOREIGN PATENT DOCUMENTS

JP    H09-226603 A    9/1997
JP    H09-317730 A    12/1997
(Continued)

OTHER PUBLICATIONS

Mar. 31, 2015 International Search Report issued in International Patent Application No. PCT/JP2014/084213.

*Primary Examiner* — Josh Skroupa
*Assistant Examiner* — Cory B Siegert
(74) *Attorney, Agent, or Firm* — Oliff PLC

(57) ABSTRACT

A pin assembly includes: a resin pin; and a collar fitted to a round shaft portion of the resin pin and having higher hardness than the resin pin. The round shaft portion is sheared to cancel connection between a first plate and a second plate upon secondary collision of a vehicle. The collar includes an end face received by a reception surface of the second plate, and shears the round shaft portion in a shear plane along the end face upon the secondary collision. The round shaft portion includes a hollow hole. An inner circumference of the hollow hole includes a straight portion which has a generating line parallel to an axial direction of (Continued)

the round shaft portion and which is traversed by a plane including the end face of the collar.

6 Claims, 10 Drawing Sheets

(58) Field of Classification Search
CPC ...... B62D 1/195; F16B 5/0024; F16B 5/0088; B60D 1/24; B60D 1/243; B60D 1/244
USPC .................... 280/775, 777, 779, 451; 74/493
See application file for complete search history.

(56) References Cited

U.S. PATENT DOCUMENTS

| | | | | |
|---|---|---|---|---|
| 4,003,288 | A * | 1/1977 | Jeal | B21J 15/043 411/70 |
| 4,915,412 | A * | 4/1990 | Yuzuriha | B62D 1/184 280/775 |
| 4,973,212 | A * | 11/1990 | Jacobs | F16B 5/0642 24/297 |
| 5,163,795 | A * | 11/1992 | Benoit | F16B 19/1081 411/41 |
| 5,199,149 | A * | 4/1993 | Matsuura | F16B 19/086 29/432 |
| 6,052,274 | A * | 4/2000 | Remsburg | F16B 19/109 361/679.58 |
| 6,339,970 | B1 * | 1/2002 | Blex | B62D 1/192 188/371 |
| 6,398,259 | B1 | 6/2002 | Palmer et al. | |
| 7,413,222 | B2 * | 8/2008 | Higashino | B62D 1/184 280/775 |
| 8,382,156 | B2 * | 2/2013 | Akutsu | B62D 1/195 280/777 |
| 8,955,883 | B2 * | 2/2015 | Nagase | B62D 1/195 280/775 |
| 9,421,995 | B2 * | 8/2016 | Johta | B62D 1/184 |
| 2008/0236326 | A1 * | 10/2008 | Matsui | B62D 1/195 74/493 |
| 2009/0249916 | A1 * | 10/2009 | Ridgway | B62D 1/192 74/492 |
| 2010/0166492 | A1 * | 7/2010 | Wang | F16B 5/00 403/2 |
| 2012/0187669 | A1 | 7/2012 | Minamigata et al. | |
| 2012/0240711 | A1 * | 9/2012 | Minamigata | B62D 1/195 74/493 |
| 2012/0291585 | A1 * | 11/2012 | Minamigata | B62D 1/195 74/493 |
| 2012/0319388 | A1 | 12/2012 | Ishii et al. | |
| 2013/0133460 | A1 | 5/2013 | Uesaka | |
| 2014/0182409 | A1 | 7/2014 | Nagase et al. | |
| 2015/0360714 | A1 | 12/2015 | Tanaka et al. | |

FOREIGN PATENT DOCUMENTS

| | | |
|---|---|---|
| JP | 2002-356168 A | 12/2002 |
| JP | 2010-163074 A | 7/2010 |
| JP | 2012-086589 A | 5/2012 |
| JP | 2012-121538 A | 6/2012 |
| JP | WO2013/069340 A1 | 4/2015 |
| WO | 2012/128171 A1 | 9/2012 |

\* cited by examiner

PIN ASSEMBLY AND STEERING DEVICE

TECHNICAL FIELD

The present invention relates to a pin assembly and a steering device.

BACKGROUND ART

In primary collision, a vehicle collides with another vehicle. Following the primary collision, secondary collision occurs in a steering device. In the secondary collision, a driver collides with a steering wheel. In order to absorb shock in the secondary collision, there have been proposed various structures for separating a part of a steering column from a vehicle body and moving the part in an axial direction of the column.

For example, according to Patent Document 1, a pair of locking notches extending in parallel to the axial direction of a column are provided on a vehicle body side bracket fixed to a vehicle body. A pair of locking capsules are retained in the locking notches by a plurality of locking pins respectively. A column side bracket is supported through the locking capsules. The locking capsules are coupled and fixed to the column side bracket through bolts inserted into the locking notches, respectively.

The locking pins for retaining the pair of locking capsules include two inside rows of locking pins and two outside rows of locking pins. The inside rows of locking pins are disposed between the pair of locking notches and arranged in parallel to the axial direction of the column. The outside rows of locking pins are disposed on the opposite sides of the pair of locking notches with respect to a direction (corresponding to the width direction of the vehicle) perpendicular to the axial direction of the column, and arranged in parallel to the axial direction of the column.

Upon secondary collision, the locking pins retaining each locking capsule are broken so that the locking capsule can leave a corresponding one of the locking notches and the locking capsule and the column side bracket can move together in the axial direction of the column.

RELATED ART DOCUMENTS

Patent Documents

Patent Document 1: JP-A-2012-121538

SUMMARY OF THE INVENTION

Problem to be Solved by the Invention

When solid resin pins formed out of resin are used as the locking pins, voids may be generated to cause a variation in shear load for each individual. Thus, there is a fear that a desired shock absorption load cannot be obtained. In addition, only the outer diameter of each solid resin pin is a factor for controlling the shear load of the resin pin. Therefore, the degree of freedom in setting the shock absorption load is low.

As a solution to this, the present inventor assumes that a hollow hole is provided in each resin pin in order to increase the degree of freedom in setting the shock absorption load while suppressing the occurrence of voids to thereby stabilize the shock absorption load. Typically, the inner surface of the hollow hole is formed into a tapered portion with a draft provided for release from a mold. Therefore, the resin pin is sheared in the tapered portion at the time of secondary collision.

When the position of a shear plane in the secondary collision has a variation in the depth direction of the hollow hole (tapered portion) due to influence of a variation in dimensional accuracy of each component, etc., the cross-sectional area of the sheared resin pin has a variation. Thus, there is a fear that the shock absorption load may have a variation.

An object of the invention is to provide a pin assembly and a steering device, capable of enhancing the degree of freedom in setting a shock absorption load while suppressing occurrence of voids to thereby stabilize the shock absorption load.

Means for Solving the Problem

Some configurations of the invention will be described below. In the following description of the configurations, signs enclosed in parenthesis are used for assisting understanding of the configurations. However, those signs are not to limit the scope to be protected by the claims of the invention.

A first configuration of the invention provides a pin assembly (U1; UE; UF; UG; UH) including: a resin pin (61; 61E; 61F; 61G; 61H) which is an injection molded piece and which includes a round shaft portion (64), the round shaft portion being inserted into a first insertion hole (66) and a second insertion hole (67) in a first direction (Z) to connect a first plate (30) and a second plate (32) with each other in a second direction (X) perpendicular to the first direction, the round shaft portion being sheared to cancel connection between the first plate and the second plate upon secondary collision of a vehicle, the first insertion hole and the second insertion hole being respectively provided in the first plate and the second plate opposing each other in the first direction; and a collar (62) which includes an inner circumference (62a) fitted to an outer circumference (64a) of the round shaft portion and an end face (622) received by a reception surface (32a) of the second plate, which has higher hardness than the resin pin, which is received in the first insertion hole, and which shears the round shaft portion in a shear plane (P1) along the end face upon the secondary collision, wherein the round shaft portion includes at least one hollow hole (81; 81E; 81F; 81G; 81H) which is provided around an axis (K1) of the round shaft portion as a center, and which extends in an axial direction (J) of the round shaft portion, and wherein an inner circumference (81a) of the hollow hole includes: a straight portion (82; 82E; 82F; 82G) which has a generating line parallel to the axial direction of the round shaft portion and which is traversed by a plane including the end face of the collar; and a tapered portion (85; 85E; 85F; 85G) which is provided for release from a mold and which is connected to the straight portion through a boundary portion (84; 84E; 84F; 84G) disposed at a position separated from the end face of the collar in the axial direction of the round shaft portion.

According to a second configuration of the invention, a plurality of the hollow holes (81E; 81G) may be provided. A plane (PE; PG) including a central axis (CE; CG) of at least one of the plurality of hollow holes and the axis (K1) of the round shaft portion may be nonparallel to the second direction (X).

According to a third configuration of the invention, in a cross-section perpendicular to the axis of the round shaft portion, a shape of the hollow hole (81F) may be a long hole shape having a longitudinal direction nonparallel to the second direction.

According to a fourth configuration of the invention, the resin pin may include a head portion (63; 63E; 63H) which is provided at one end of the round shaft portion and which has a diameter larger than the round shaft portion, and the outer circumference of the round shaft portion may include a diameter expansion portion (86) that is press-fitted into the second insertion hole at a position avoiding a radially outer side of the straight portion.

According to a fifth configuration of the invention, the hollow hole (81H) may penetrate the resin pin (61H).

A sixth configuration of the invention provides a steering device (1) including the pin assembly according to any one of the aforementioned first through fifth configurations.

Advantage of the Invention

According to the aforementioned first configuration, occurrence of voids can be suppressed due to the hollow hole provided in the resin pin. In addition, a shear plane (which coincides with a plane including an end face of the collar) traverses the straight portion surely upon secondary collision, so that a part surrounding the straight portion can be sheared surely upon the secondary collision. Due to this, which is associated with the suppression of occurrence of voids, a stable shear load can be obtained. As a result, it is possible to obtain a stable shock absorption load.

In addition, when specifications of the hollow hole of the resin pin (for example, the number of hollow holes, the cross-sectional shape of each hollow hole, the inner diameter of each hollow hole, etc.) are adjusted, it is possible to improve the degree of freedom in setting a shear load of the resin pin upon secondary collision, and hence it is possible to improve the degree of freedom in setting a shock absorption load upon the secondary collision.

According to the aforementioned second configuration, the following effect can be obtained. That is, upon secondary collision, each hollow hole is deformed to be flat in the second direction, and the resin pin then begins to be sheared. The second configuration of the invention in which a plurality of hollow holes are provided will be compared with a case in which a single hollow hole having a cross-sectional area equal to the total cross-sectional area of the hollow holes in the second configuration is provided. Since the shear area of the resin pin is fixed in the two cases, a peak load of the shock absorption load is equal. On the other hand, in the former, that is, in the second configuration of the invention, a deformation margin generated in the hollow holes before the start of shearing can be made smaller than that in the latter. Therefore, the timing when a peak load appears can be made earlier.

According to the aforementioned third configuration, a deformation margin generated in the hollow hole with respect to the second direction before the start of shearing can be reduced. Therefore, the timing when a peak load appears can be made earlier.

According to the aforementioned fourth configuration, the collar can be retained on the round shaft portion between the head portion and the diameter expansion portion of the resin pin during assembling. Accordingly, the resin pin and the collar can be handled as an integrated unit, so that assemblability can be improved. In addition, the diameter expansion portion is disposed in a position avoiding the radially outer side of the straight portion. Thus, there is no fear that the diameter expansion portion may give influence to the shear area, and there is no fear that the diameter expansion portion may interfere with stabilization of the shock absorption load.

According to the aforementioned fifth configuration, the hollow hole can be visually recognized from any one of the opposite side portions of the resin pin. Accordingly, for example, resin pins having a plurality of specifications and including hollow holes different in specifications from one another (the number of hollow holes, the cross-sectional shape of each hollow hole, the inner diameter of each hollow hole, etc.) can be distinguished easily. In addition, for example, two kinds of resin pins whose round shaft portions have different diameters can be distinguished based on whether a hollow hole penetrate a resin pin or not. Thus, wrong assembling of resin pins can be prevented as much as possible.

A steering device provided with the pin assembly is preferable because a stable shock absorption load can be obtained.

MODE FOR CARRYING OUT THE INVENTION

Preferred embodiments of the invention will be described with reference to the accompanying drawings.

First Embodiment

Figure 1:
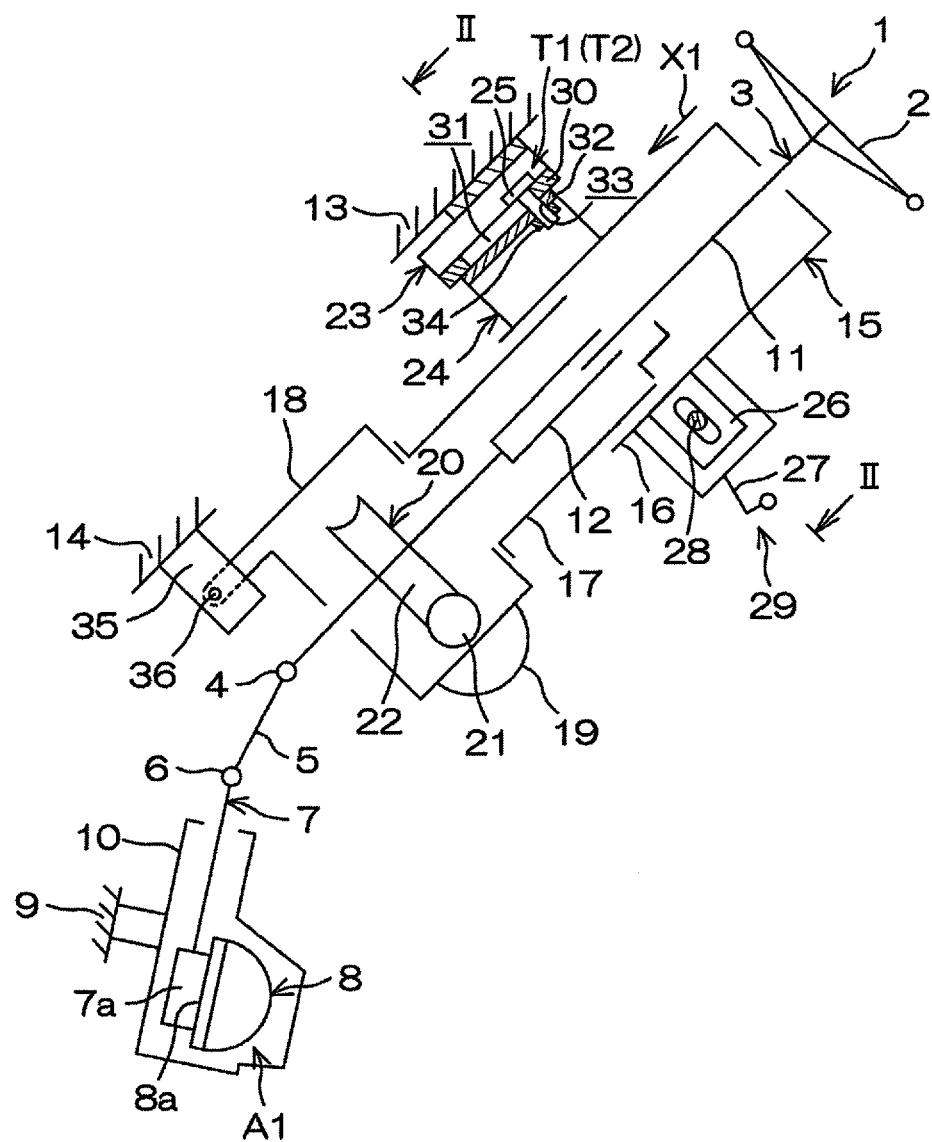
FIG. 1 is a schematic side view of a steering device according to a first embodiment of the invention, showing a schematic configuration of the steering device.

FIG. 1 is a schematic view showing a schematic configuration of a steering device according to an embodiment of the invention. Refer to FIG. 1. A steering device 1 has a steering shaft 3, an intermediate shaft 5, a pinion shaft 7, and a rack shaft 8. The steering shaft 3 is connected to a steering member 2 such as a steering wheel. The intermediate shaft 5 is connected to the steering shaft 3 through a universal joint 4. The pinion shaft 7 is connected to the intermediate shaft 5 through a universal joint 6. The rack shaft 8 serves as a steering shaft and having a rack 8a that can mesh with a pinion 7a provided near an end portion of the pinion shaft 7.

A steering mechanism A1 is constituted by a rack and pinion mechanism including the pinion shaft 7 and the rack shaft 8. The rack shaft 8 is supported by a housing 10 fixed to a vehicle body side member 9 so that the rack shaft 8 can move in an axial direction (which is a direction perpendicular to the surface of the paper) along a left/right direction of the vehicle. Although not shown, each end portion of the rack shaft 8 is connected to a corresponding steering wheel through a corresponding tie rod and a corresponding knuckle arm.

The steering shaft 3 has an upper shaft 11 and a lower shaft 12, which are connected to each other, for example, in a spline connection manner, movably together with each other and movably relatively to each other in the axial direction. The steering shaft 3 is rotatably supported through a not-shown bearing by a steering column 15 fixed to vehicle body side members 13 and 14.

The steering column 15 has a cylindrical upper jacket 16 (movable jacket), a cylindrical lower jacket 17, and a housing 18. The upper jacket 16 and the lower jacket 17 are fitted to each other movably relatively to each other in the axial direction. The housing 18 is connected to the axially lower end of the lower jacket 17. A reduction gear mechanism 20 that reduces the power of an electric motor 19 for assisting steering and transmits the reduced power to the lower shaft 12 is received in the housing 18. The reduction gear mechanism 20 has a driving gear 21 and a driven gear 22. The driving gear 21 is connected to a rotary shaft (not shown) of the electric motor 19 movably together therewith. The driven gear 22 is engaged with the driving gear 21 so as to rotate together with the lower shaft 12.

This embodiment will be described along an example in which the steering device 1 is applied to an electric power steering device. However, the invention may be applied to a manual steering device. In addition, the embodiment will be described along a case in which the steering device 1 can perform tilt adjustment. However, the invention may be applied to a steering device that does not have a tilt adjustment function, or may be applied to a steering device that can perform tilt adjustment and telescopic adjustment.

Figure 2:
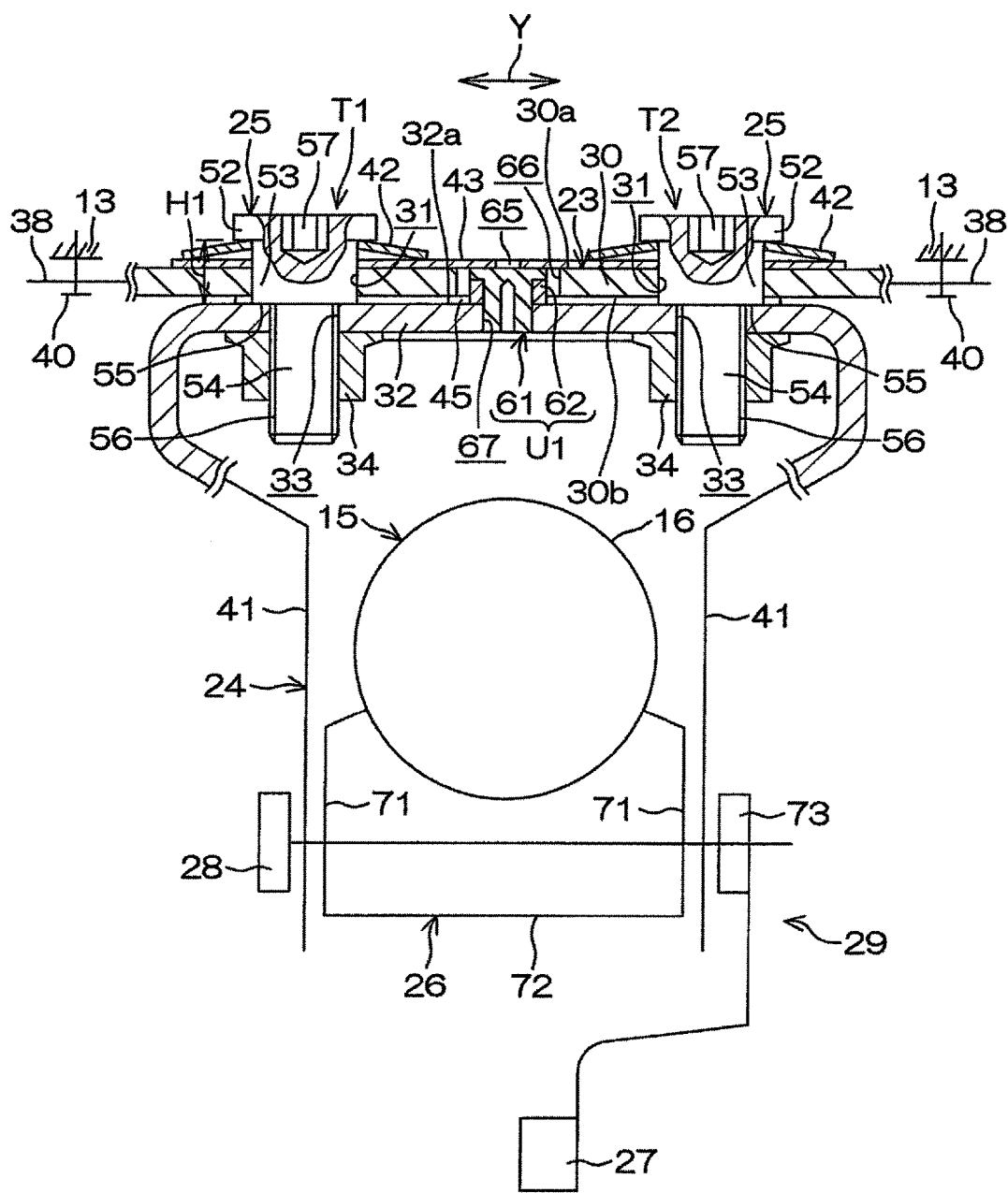
FIG. 2 is a schematic cross-sectional view of the steering device in FIG. 1, showing a cross-section along the line II-II in FIG. 1.

As shown in FIG. 2 that is a schematic cross-sectional view, the steering device 1 has a pair of suspension mechanisms T1 and T2 in which the upper jacket 16 can be suspended through a tilt bracket 24 as a movable bracket by a fixed bracket 23. That is, as shown in FIG. 1 and FIG. 2, the tilt bracket 24 as a movable bracket is suspended through suspension bolts 25 as suspension shafts of the paired suspension mechanisms T1 and T2 by the fixed bracket 23 fixed to the vehicle body side member 13. On the other hand, a column bracket 26 is fixed to the upper jacket 16 of the steering column 15.

As shown in FIG. 1 and FIG. 2, the steering device 1 has a lock mechanism 29 in which the position of the column bracket 26 (and hence the positions of the upper jacket 16 and the steering member 2) after the tilt adjustment can be locked or unlocked through the tilt bracket 24 by a fastening shaft 28 in accordance with operation on an operation lever 27.

Figure 3:
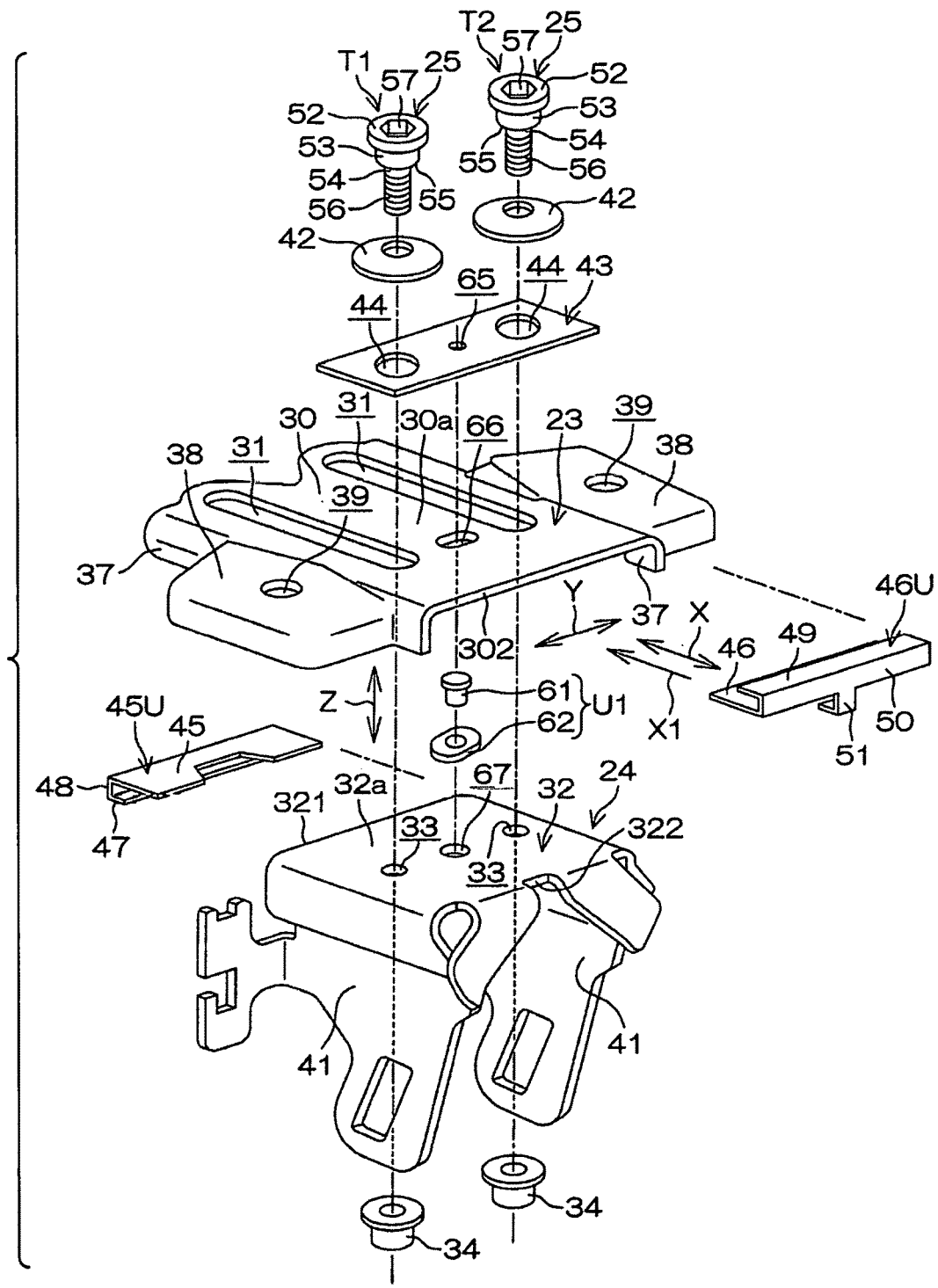
FIG. 3 is an exploded perspective view of the steering device in FIG. 1.

As shown in FIG. 2 and FIG. 3, the tilt bracket 24 has a pair of side plates 41. As shown in FIG. 2, the column bracket 26 has a groove shape provided with a pair of side plates 71 opposing the pair of side plates 41 of the tilt bracket 24 respectively, and a connection plate 72 serving for connection between the lower ends of the pair of side plates 71.

Refer to FIG. 2. The fastening shaft 28 is made of a bolt penetrating side plates 41 and 71 of the tilt bracket 24 and the column bracket 26. When a nut 73 screwed down to the fastening shaft 28 is turned by rotation operation on the operation lever 27, the two side plates 41 and 71 can be fastened between the head portion of the bolt as the fastening shaft 28 and the nut 73. Thus, the two side plates 41 and 71 can be locked. The position of the steering member 2 after the tilt adjustment is locked in this manner. Thus, tilt lock can be attained.

Figure 7:
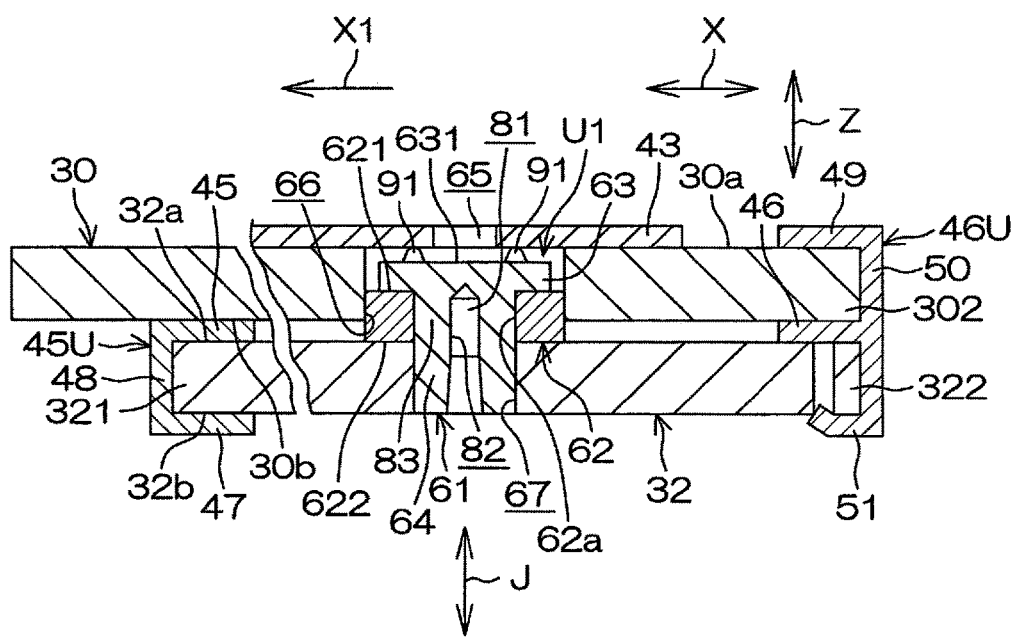
FIG. 7 is a cross-sectional view of the first plate and the second plate before secondary collision in the first embodiment, showing a state where the second plate is disposed in a predetermined position of the first plate.
Figure 8:
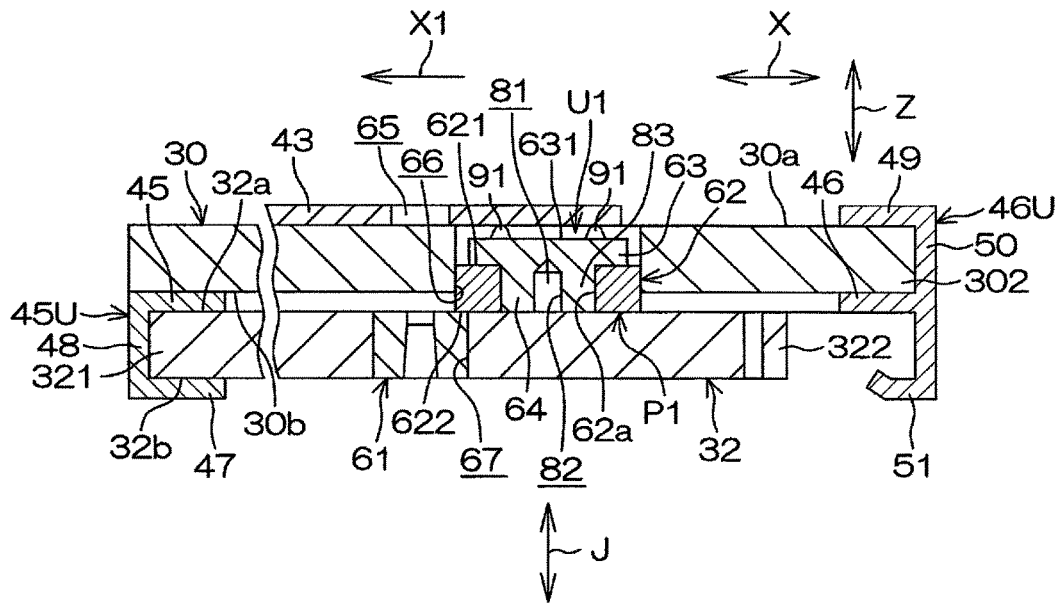
FIG. 8 is a cross-sectional view of the first plate and the second plate at the time of secondary collision, showing a state where the second plate has been separated from the predetermined position of the first plate in a column moving direction due to shearing of the resin pin.

In addition, the steering device 1 has a pin assembly U1, which constitutes a connection/separation mechanism for connecting the first plate 30 of the fixed bracket 23 and the second plate 32 of the tilt bracket 24 so that the second plate 32 can be separated from a predetermined position (the position shown in FIG. 7) of the first plate 30 in a column moving direction X1 as shown in FIG. 8 when secondary collision occurs.

Figure 4:
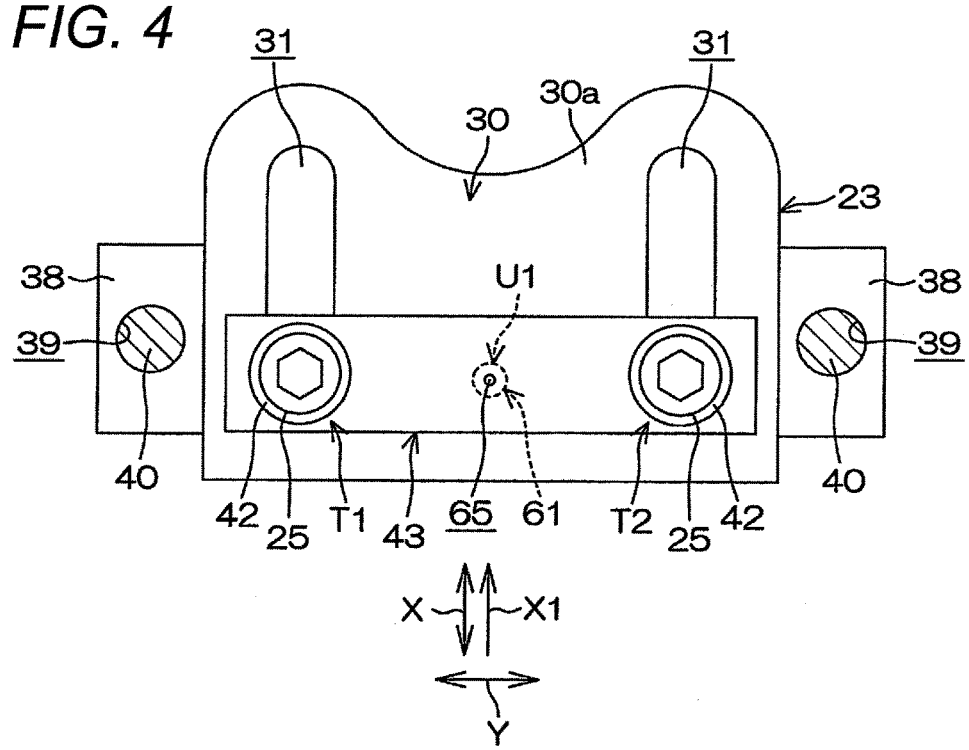
FIG. 4 is a partially broken schematic plan view of a fixed bracket, a pair of suspension mechanisms, and a connection/separation mechanism according to a first embodiment.

As shown in FIG. 2 and FIG. 4 that is a partially broken schematic plan view, the pin assembly U1 as the connection/separation mechanism is disposed between the paired suspension mechanisms T1 and T2 (that is, between a pair of first holes 31 in the first plate 30 of the fixed bracket 23, which will be described later) with respect to a direction Y perpendicular to the column moving direction X1. Specifically, the pin assembly U1 is disposed in a central position between the paired first holes 31 (that is, between the pair of suspension bolts 25) with respect to the direction Y perpendicular to the column moving direction X1.

Refer to FIG. 1. The fixed bracket 23 is provided with the first plate 30 parallel to the column moving direction X1 (corresponding to the axial direction of the steering shaft 3) in which the column can move upon secondary collision. The first holes 31 for the suspension mechanisms T1 and T2 are formed in the first plate 30. The first holes 31 are made of long holes extending in parallel to the column moving direction X1. On the other hand, the tilt bracket 24 (movable bracket) is provided with the second plate 32 opposing the first plate 30. Second holes 33 for the suspension mechanisms T1 and T2 are formed in the second plate 32. The second holes 33 are opposing parts of the first holes 31 respectively.

The suspension bolts 25 are inserted into the first holes 31 of the first plate 30 and the second holes 33 of the second plate 32 and screwed down to the nuts 34. The suspension bolts 25 connecting the first plate 30 and the second plate 32 in cooperation with the nuts 34 suspend the upper jacket 16 (movable jacket) through the tilt bracket 24 (movable bracket) and the column bracket 26. In addition, the suspension bolts 25 can move in the column moving direction X1 along the first holes 31 together with the tilt bracket 24 (movable bracket), the column bracket 26 and the upper jacket 16 upon secondary collision.

A lower bracket 35 fixed to the vehicle body side member 14 supports a tilt center shaft 36 serving as a pivot shaft. The tilt center shaft 36 supports the lower jacket 17 through the housing 18 of the steering column 15 so that the lower shaft 17 can swing around the tilt center shaft 36.

As shown in FIG. 2 and FIG. 3, the suspension mechanisms T1 and T2 are constituted by the suspension bolts 25, plate springs 42 that are, for example, made of disc springs, the nuts 34, etc. respectively. The pin assembly U1 is constituted by a resin pin 61 and a cylindrical collar 62. The resin pin 61 can be sheared upon secondary collision. The collar 62 has higher hardness than the resin pin 61. The collar 62 is fitted to an axial part of the resin pin 61. Incidentally, any material may be used for the collar 62 as long as it has higher hardness than the resin pin 61. Metal may be used for the collar 62. Alternatively, high-hardness resin may be used, or ceramic may be used.

Refer to FIG. 3. The fixed bracket 23 has a pair of side plates 37 and a pair of mounting plates 38. The side plates 37 are provided to extend downward from a pair of side edges of the first plate 30 respectively. The mounting plates 38 are provided to extend outward from the paired side plates 37 respectively. The fixed bracket 23 is, for example, formed out of a metal plate. The mounting plates 38 are fixed to the vehicle body side member 13 by fixing bolts 40 (see FIG. 4) inserted into threaded insertion holes 39 (see FIG. 3 and FIG. 4) provided in the mounting plates 38, respectively. Thus, the fixed bracket 23 is fixed to the vehicle body side member 13.

Refer to FIG. 2 to FIG. 4. In the first plate 30 of the fixed bracket 23, the paired first holes 31 are provided correspondingly to the paired suspension bolts 25. The paired first holes 31 extend in parallel to the column moving direction X1 in which the column can move upon secondary collision. In addition, the paired first holes 31 are separated from each other in the direction Y perpendicular to the column moving direction X1.

As shown in FIG. 2 and FIG. 3, the tilt bracket 24 (movable bracket) is, for example, formed out of a metal plate. The tilt bracket 24 provided with the second plate 32 and the paired side plates 41 provided to extend downward from a pair of side edges of the second plate 32 respectively has a groove shape. A connection portion between the second plate 32 and each side plate 41 may be formed into a curved shape as shown in FIG. 2 and FIG. 3.

In the second plate 32 of the tilt bracket 24, the paired second holes 33 are provided correspondingly to the paired suspension bolts 25. Each suspension bolt 25 is inserted into a corresponding one of the annular plate springs 42 that are, for example, made of disc springs, a corresponding one of insertion holes 44 of a slide plate 43, a corresponding one of the first holes 31 of the first plate 30, and a corresponding one of the second holes 33 of the second plate 32 sequentially, and screwed down into a corresponding one of the nuts 34. In this manner, the suspension bolts 25 suspend the tilt bracket 24.

As shown in FIG. 3 and FIG. 4, the slide plate 43 is made of a long plate extending in the direction Y perpendicular to the column moving direction X1. As shown in FIG. 2, the slide plate 43 is put between each of the two plate springs 42 and an upper surface 30a of the first plate 30. Of the slide plate 43, at least the surface on the first plate 30 side is formed out of a low friction material such as fluororesin. That is, the slide plate 43 may be entirely formed out of a low friction material, or the first plate 30 side surface of the slide plate 43 may be coated with a low friction material.

As shown in FIG. 7, a first intervention plate 45 and a second intervention plate 46 are put between the first plate 30 and the second plate 32. The first intervention plate 45 and the second intervention plate 46 serve for reducing the sliding resistance with which the second plate 32 moves relatively to the first plate 30 in the column moving direction X1 upon secondary collision.

As shown in FIG. 3 and FIG. 7, the first intervention plate 45 forms a groove-like unit 45U that is locked to a first end portion 321, which is an end portion of the second plate 32 on the column moving direction X1 side. That is, the unit 45U is provided with the first intervention plate 45, an opposed plate 47, and a connection plate 48. The first intervention plate 45 extends along a reception surface 32a, which is an upper surface of the second plate 32, and a lower surface 30b of the first plate 30. The opposed plate 47 opposes the first intervention plate 45 and extends along a lower surface 32b of the second plate 32. The connection plate 48 connects the first intervention plate 45 and the opposed plate 47 and is engaged with the column moving direction X1 side edge of the second plate 32.

Of the first intervention plate 45, at least the surface on the first plate 30 side is formed out of a low friction material such as fluororesin. That is, the first intervention plate 45 or the unit 45U may be formed out of a low friction material, or the first plate 30 side surface of the first intervention plate 45 may be coated with a low friction material.

The second intervention plate 46 forms a unit 46U that is locked to a second end portion 302, which is an end portion of the first plate 30 on the opposite side to the column moving direction X1, and a second end portion 322, which is an end portion of the second plate 32 on the opposite side to the column moving direction X1. That is, the unit 46U is provided with the second intervention plate 46 and an opposed plate 49. The second intervention plate 46 extends along the reception surface 32a (upper surface) of the second plate 32, and the lower surface 30b of the first plate 30. The opposed plate 49 opposes the second intervention plate 46 and extends along the upper surface 30a of the first plate 30. In addition, the unit 46U has a connection plate 50 and a lock portion 51. The connection plate 50 connects the second intervention plate 46 and the opposed plate 49 and abuts against the opposite edge of the first plate 30 to the column moving direction X1. The lock portion 51 has, for example, a hook-like shape, so that the lock portion 51 can be hooked and locked to the second end portion 322 of the second plate 32.

Of the second intervention plate 46, at least the surface on the second plate 32 side is formed out of a low friction material such as fluororesin. That is, the second intervention plate 46 or the unit 46U may be formed out of a low friction material, or the second plate 32 side surface of the second intervention plate 46 may be coated with a low friction material.

As shown in FIG. 2 and FIG. 3, each suspension bolt 25 has a head portion 52, a large diameter portion 53, a small diameter portion 54, a step portion 55, and a threaded portion 56. The large diameter portion 53 connected to the head portion 52 has a smaller diameter than the head portion 52. The small diameter portion 54 connected to the large diameter portion 53 has a smaller diameter than the large diameter portion 53. The step portion 55 is formed between the large diameter portion 53 and the small diameter portion 54. The threaded portion 56 is provided in the small diameter portion 54. A tool engagement portion 57 that is, for example, shaped into a hexagonal hole is provided in the head portion 52.

As shown in FIG. 2, the large diameter portion 53 is inserted into the annular plate spring 42, the insertion hole 44 of the slide plate 43, and the first hole 31 of the first plate 30. The step portion 55 abuts against the reception surface 32a (upper surface) of the second plate 32 so as to be received by the reception surface 32a. The second plate 32 is held between the step portion 55 and the nut 34. Thus, the suspension bolt 25 and the second plate 32 are fixed to each other.

A distance H1 (corresponding to the axial length of the large diameter portion 53) between the head portion 52 and the step portion 55 is made larger than the total sum of the plate thickness of the first intervention plate 45 (or the plate thickness of the second intervention plate 46) put between the first plate 30 and the second plate 32, the plate thickness of the first plate 30, the plate thickness of the slide plate 43 extending along the upper surface 30a of the first plate 30, and the plate thickness of the plate spring 42 that has been most compressed. Thus, the plate spring 42 elastically urges the first plate 30 toward the second plate 32 through the slide plate 43.

Figure 5:
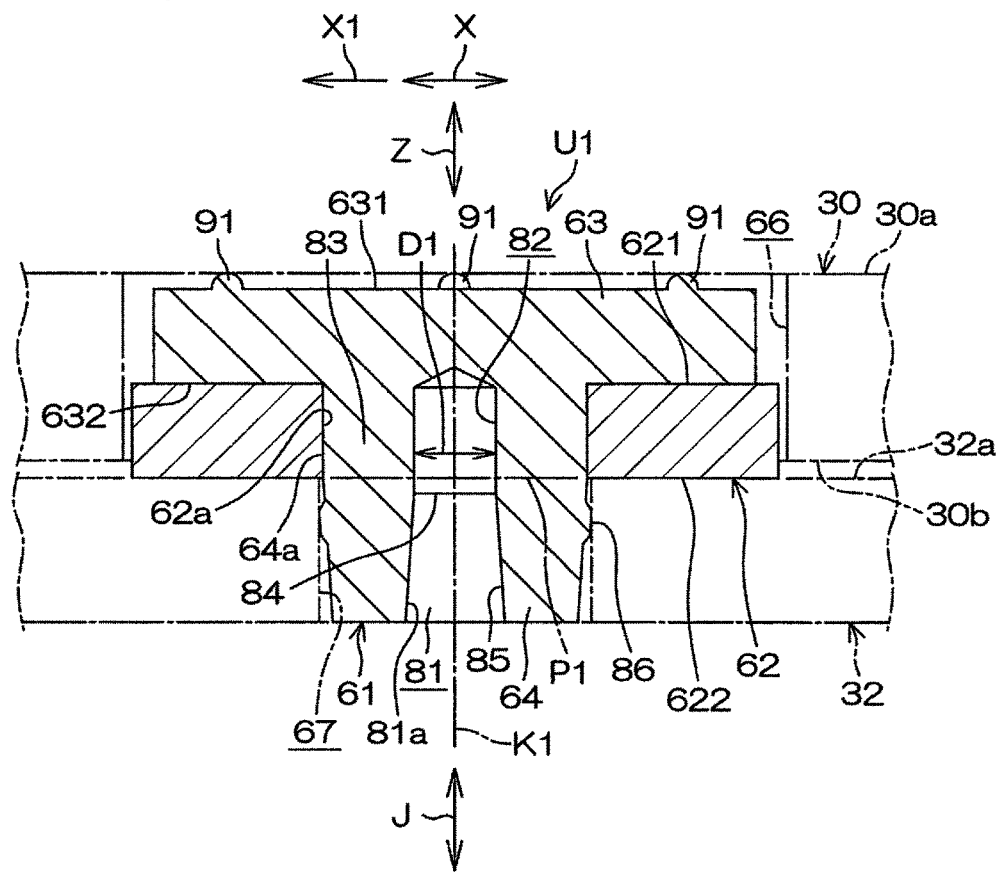
FIG. 5 is a partial cross-sectional view of a pin assembly including a resin pin and a collar, showing a cross-section in a front/rear direction including an axis of the resin pin according to a first embodiment. A first plate and a second plate to be connected by the pin assembly are depicted by the imaginary lines.

As shown in FIG. 5, the rein pin 61 of the pin assembly U1 as the connection/separation mechanism has a columnar (at least partially cylindrical) round shaft portion 64 and a head portion 63. The head portion 63 is provided at one end of the round shaft portion 64. The head portion 63 has a circular shape in cross-section larger in diameter than the round shaft portion 64. The resin pin 61 is an injection molded piece formed by injection molding. The cylindrical collar 62 includes an inner circumference 62a, a first end face 621, and a second end face 622. The inner circumference 62a is fitted to an outer circumference 64a of the round shaft portion 64. The first end face 621 abuts against the head portion 63 of the resin pin 61. The second end face 622 abuts against the second plate 32. The collar 62 serves for shearing the round shaft portion 64 (specifically, a straight portion surrounding portion 83 of the round shaft portion 64, which will be described later) in a shear plane P1 along the second end face 622 upon secondary collision.

The round shaft portion 64 is inserted into a first insertion hole 66 of the first plate 30 and a second insertion hole 67 of the second plate 32 in a first direction Z (corresponding to the direction in which the first plate 30 and the second plate 32 oppose each other) so as to connect the first plate 30 and the second plate 32 to each other with respect to a second direction X perpendicular to the first direction Z. The second direction X is a direction including the column moving direction X1 and an opposite direction thereto. The round shaft portion 64 is sheared to cancel the connection between the first plate 30 and the second plate 32 when secondary collision occurs in the vehicle.

The round shaft portion 64 includes a hollow hole 81 which is provided around an axis K1 of the round shaft portion 64 as a center and which extends in an axial direction J of the round shaft portion 64. An inner circumference 81a of the hollow hole 81 has a straight portion 82. The straight portion 82 has a generating line parallel to the axial direction J of the round shaft portion 64. The straight portion 82 is traversed by a plane (corresponding to the shear plane P1) including the second end face 622 of the collar 62. In addition, the round shaft portion 64 includes a straight portion surrounding portion 83, which is a part surrounding the straight portion 82 circumferentially.

Figure 6:
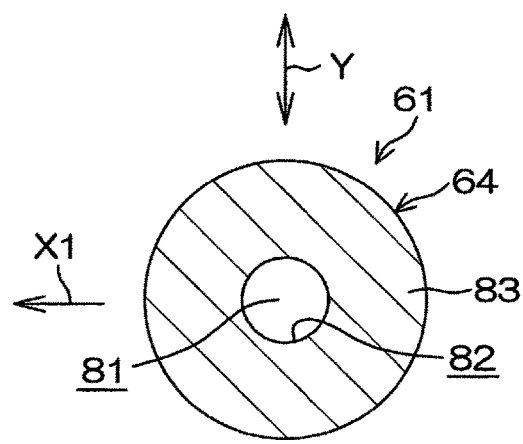
FIG. 6 is a cross-sectional view showing the resin pin whose straight portion has been cut off in the first embodiment.

An inner diameter D1 of the straight portion 82 with respect to a predetermined radial direction is fixed in spite of its position varying in the axial direction J of the round shaft portion. As shown in FIG. 6, the cross-sectional shape of the straight portion 82 is, for example, circular as shown in FIG. 6. The straight portion 82 extends to the opposite sides of the shear plane P1 with respect to the axial direction J of the round shaft portion 64. The straight portion 82 is forcibly extracted from a mold when the resin pin 61 molded out of resin is released from the mold.

The round shaft portion 64 also includes a tapered portion 85 for release from the mold. The tapered portion 85 is connected to the straight portion 82 through a boundary portion 84. The boundary portion 84 is disposed in the second insertion hole 67 of the second plate 32. That is, the boundary portion 84 is disposed at a position separated from the second end face 622 of the collar 62 in the axial direction J of the round shaft portion 64. The boundary portion 84 is disposed more closely to the second plate 32 than the shear plane P1 with respect to the axial direction J of the round shaft portion 64. The outer circumference 64a of the round shaft portion 64 includes a diameter expansion portion 86 in a position avoiding the radially outer side of the straight portion 82. The diameter expansion portion 86 is press-fitted into the second insertion hole 67. The diameter expansion portion 86 may be an annular protrusion provided all over the outer circumference 64a of the round shaft portion 64 or may be made of a plurality of protrusions arrayed annularly in the circumferential direction of the outer circumference 64a.

The first axial end face 621 of the collar 62 abuts against the head portion 63 of the resin pin 61, and the second axial end portion 622 of the collar 62 is received by the reception surface 32a of the second plate 32. Thus, the resin pin 61 and the collar 62 are prevented from coming off under the second plate 32.

On the other hand, as shown in FIG. 7, the slide plate 43 is disposed to cover the resin pin 61 and the head portion 63 from above, so that the resin pin 61 can be prevented from coming off upward. In addition, a resin pin visual recognition hole 65 whose diameter is smaller than the outer diameter of the head portion 63 is formed in the slide plate 43 so as to face the head portion 63 of the resin pin 61. After the pin assembly U1 is fitted, the head portion 63 of the resin pin 61 is visually recognized through the resin pin visual recognition hole 65 of the slide plate 43. Thus, it is possible to easily determine a working failure such as forgetting of fitting of the resin pin 61.

As shown in FIG. 5, the head portion 63 has a first face 631 opposing the slide plate 43, and a second face 632 opposing the first end face 621 (upper end face) of the collar 62. As shown in FIG. 7 and FIG. 8, a plurality of elastic protrusions 91 protruding in the axial direction of the resin pin 61 are provided in the first face 631. Specifically, the elastic protrusions 91 are disposed to be arranged circumferentially at equal intervals on the circumference surrounding the resin pin visual recognition hole 65 in planar view.

The elastic protrusions 91 that have been elastically compressed abut against the lower surface of the slide plate 43 so that the slide plate 43 can be pressed and urged directly by elastic repulsion. Reaction force given from the slide plate 43 to the elastic protrusions 91 urges the second end face 622 of the collar 62 toward the reception surface 32a (upper surface) of the second plate 32 through the head portion 63.

As shown in FIG. 5, the head portion 63 of the resin pin 61 and a major part of the collar 62 are inserted into the first insertion hole 66 of the first plate 30 of the fixed bracket 23. A part of the collar 62 projects over the first insertion hole 66. Of the round shaft portion 64 of the resin pin 61, a part protruding from the collar 62 is inserted into the second insertion portion 67 of the second plate 32 of the tilt bracket 24 (movable bracket).

Upon secondary collision, as shown in FIG. 8, the round shaft portion 64 of the resin pin 61 is sheared in the shear plane P1 along the second end face 622 of the collar 62 due to positional displacement between the second end face 622 of the collar 62 and the reception surface 32a (upper surface) of the second plate 32 caused by relative movement between the first plate 30 and the second plate 32. A shear blade constituted by the inner circumferential edge of the second end face 622 of the collar 62 has a shape like an arc, and a shear blade constituted by an edge portion of the second insertion hole 67 of the second plate 32 also has a shape like an arc. By the effect of the elastic protrusions 91, the second end face 622 of the collar 62 comes in surface contact with the reception surface 32a of the second plate 32 so that the position of the shear plane P1 can be stabilized with respect to the axial direction J of the round shaft portion 64.

According to the embodiment, the hollow hole 81 is provided to reduce the thickness of the resin pin 61 so that occurrence of voids can be suppressed. In addition, specifications of the hollow hole 81 of the resin pin 61 (for example, the inner diameter of the hollow hole 81, or the number of hollow holes, the cross-sectional shape of each hollow hole, etc. as shown in second to fourth embodiments below) are adjusted, it is possible to improve the degree of freedom in setting a shear load of the resin pin 61 upon secondary collision, and hence it is possible to improve the degree of freedom in setting a shock absorption load upon the secondary collision.

If a shear plane in secondary collision traversed the tapered portion, the position of the shear plane might vary with respect to the axial direction of the round shaft portion, causing a variation in shear area. Thus, a shear load might vary, and a shock absorption load might vary.

On the other hand, in the embodiment in which the shear plane P1 (coinciding with a plane including the second end face 622 of the collar 62) traverses the straight portion 82, the shear area is fixed with respect to the axial direction J of the round shaft portion 64 in spite of a variation in position of the shear plane P1 upon secondary collision. Due to this, which is associated with the suppression of occurrence of voids, a stable shear load can be obtained. As a result, it is possible to obtain a stable shock absorption load.

In addition, the hollow hole 81 includes the tapered portion 85 provided for release from a mold and connected to the straight portion 82 through the boundary portion 84. Accordingly, when released from the mold, a core for forming the hollow hole 81 can be extracted easily by the effect of the tapered portion 85.

In addition, when assembled, the collar 62 can be retained on the round shaft portion 64 between the head portion 63 of the rein pin 61 and the diameter expansion portion 86. Accordingly, the pin assembly U1 can be formed out of the resin pin 61 and the collar 62 as a unit that can be handled integrally. Thus, assemblability can be improved. In addition, the diameter expansion portion 86 is disposed in a position avoiding the radially outer side of the straight portion 82. Accordingly, there is no fear that the diameter expansion portion 86 may give influence to the shear area, and there is no fear that the diameter expansion portion 86 may interfere with stabilization of the shock absorption load.

Favorably, the steering device 1 provided with the pin assembly U1 can obtain a stable shock absorption load.

Second Embodiment

Figure 9:
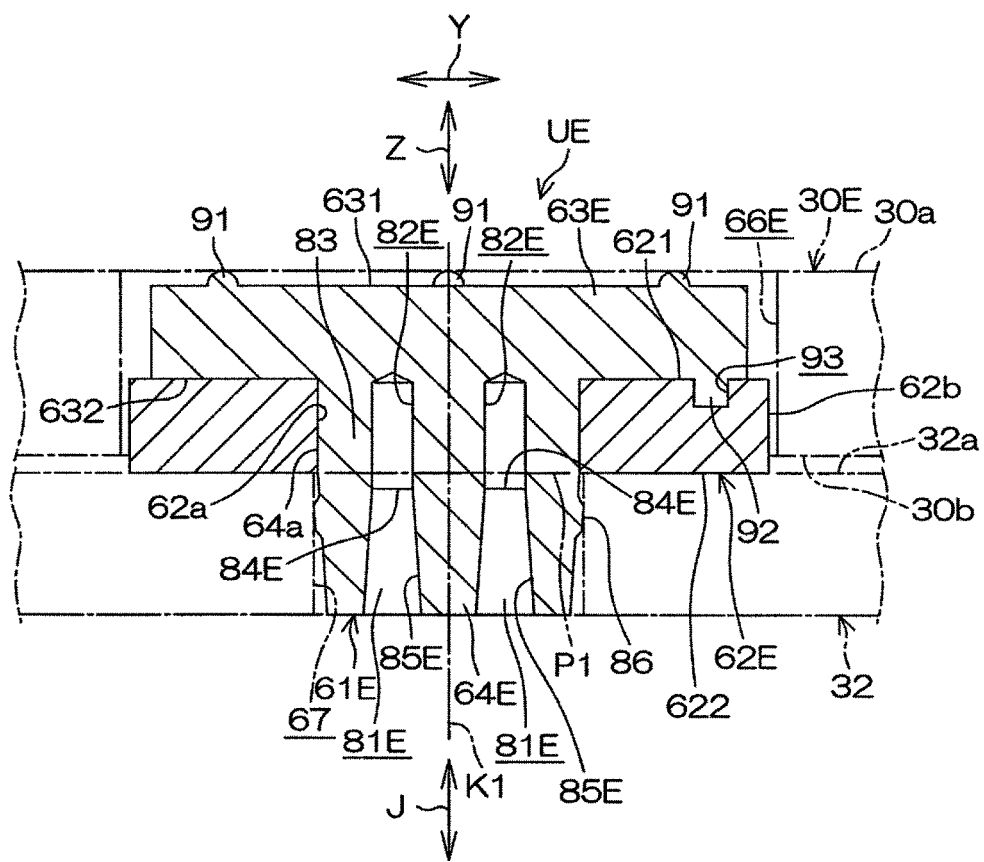
FIG. 9 is a partial cross-sectional view of a pin assembly including a resin pin and a collar according to a second embodiment of the invention, showing a cross-section in a left/right direction including an axis of the resin pin. A first plate and a second plate to be connected by the pin assembly are depicted by the imaginary lines.
Figure 10:
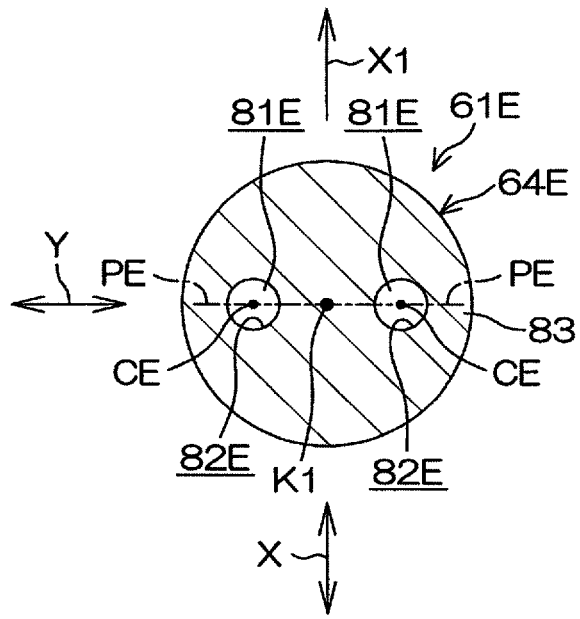
FIG. 10 is a cross-sectional view showing the resin pin whose straight portion has been cut off in the second embodiment.

FIG. 9 is a cross-sectional view of a pin assembly UE including a resin pin 61E and a collar 62E according to a second embodiment of the invention, showing a cross-section in a left/right direction including an axis K1 of a round shaft portion 64E of the resin pin 61E. The left/right direction in FIG. 9 corresponds to the left/right direction (direction Y perpendicular to a column moving direction X1) of a vehicle. FIG. 10 is a cross-sectional view of the resin pin 61E cut off in a straight portion 82E.

Refer to FIG. 9 and FIG. 10. The second embodiment has a major difference from the first embodiment in FIG. 5 and FIG. 6 as follows. That is, in the first embodiment, a single hollow hole 81 is provided as shown in FIG. 5 and FIG. 6. On the other hand, in the second embodiment, a plurality (two in the second embodiment) of hollow holes 81E are provided as shown in FIG. 9 and FIG. 10. The inner circumference of each hollow hole 81E includes a straight portion 82E and a tapered portion 85E connected to the straight portion 82E through a boundary portion 84E.

A cross-sectional shape of the straight portion 82E of each hollow hole 81E is circular as shown in FIG. 10. The two hollow holes 81E may be disposed symmetrically with respect to an axis K1 of the round shaft portion 64E.

As shown in FIG. 10, each plane PE including a central axis CE of each hollow hole 81E and the axis K1 of the round shaft portion 64E is nonparallel to a second direction X. For example, each plane PE is perpendicular to the second direction X (column moving direction X1) and extends along the left/right direction (direction Y perpendicular to the column moving direction X1). However, it will go well if the plane PE including the central axis CE of at least one hollow hole 81E and the axis K1 of the round shaft portion 64E is nonparallel to the second direction X.

In addition, as shown in FIG. 9, at least one rotation regulation protruding portion 92 protruding toward a first end face 621 of the collar 62E is provided in a second face 632 of a head portion flange 63E. In addition, a rotation regulation recess portion 93 to be engaged with the rotation regulation protruding portion 92 is provided in the first face 621 of the collar 62E. Relative rotation between the resin pin 61E and the collar 62E (rotation of the resin pin 61E around the axis K1 of the round shaft portion 64E) is regulated by the engagement between the rotation regulation protruding portion 92 with the rotation regulation recess portion 93.

On the other hand, though not shown, an outer circumference 62b of the collar 62E has a laterally long cross-sectional shape such as an oval long in the direction Y perpendicular to the column moving direction X1. A first insertion hole 66E of a first plate 30E to which the outer circumference 62b of the collar 62E is fitted is a laterally long hole, which is long in the direction Y perpendicularly to the column moving direction X1. Thus, the rotation of the collar 62E is regulated by the first insertion hole 66E. That is, the first insertion hole 66E regulates the rotation of the resin pin 61E around the axis K1 through the collar 62E.

Constituents of the second embodiment in FIG. 9 and FIG. 10 the same as those of the first embodiment in FIG. 5 and FIG. 6 are referenced correspondingly by the same reference signs as those of the constituents of the first embodiment in FIG. 5 and FIG. 6.

Upon secondary collision, the hollow holes 81E are deformed to be flat with respect to the second direction X (column moving direction X1), and then the resin pin 61E begins to be sheared. The second embodiment in which a plurality of hollow holes 81E are provided will be compared with the first embodiment under the condition that the single hollow hole 81 provided in the first embodiment has a cross-sectional area equal to the total cross-sectional area of the hollow holes 81E.

Figure 11:
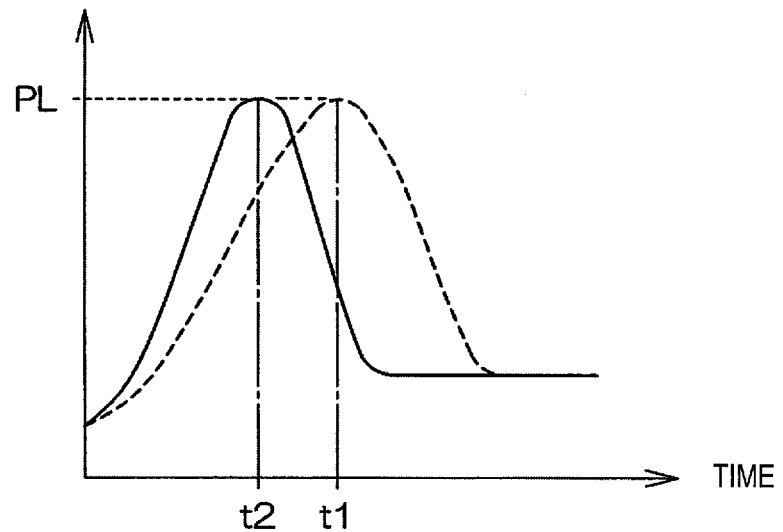
FIG. 11 is a graph showing a chronological change of a shock absorption load by the pin assembly according to the second embodiment, in comparison with a chronological change of a shock absorption load by the pin assembly according to the first embodiment.

Under the aforementioned condition, the shear area of the resin pin 61E in the second embodiment is equal to the shear area of the resin pin 61 in the first embodiment. Therefore, a peak load PL of a shock absorption load in the second embodiment is equal to that in the first embodiment as shown in FIG. 11. FIG. 11 shows the relationship between the lapse time from occurrence of secondary collision and the shock absorption load.

On the other hand, a deformation margin generated in the hollow holes 81E before the start of shearing in the second embodiment is smaller than a deformation margin generated in the hollow hole 81 before the start of shearing in the first embodiment. Therefore, in the second embodiment, the peak load PL of the shock absorption load (designated by the solid line) can be made to appear at a timing t2 earlier than a timing t1 when the peak load PL of the shock absorption load (designated by the broken line) appears in the first embodiment under the aforementioned condition. Thus, the shock absorption characteristic can be improved.

Third Embodiment

Figure 12:
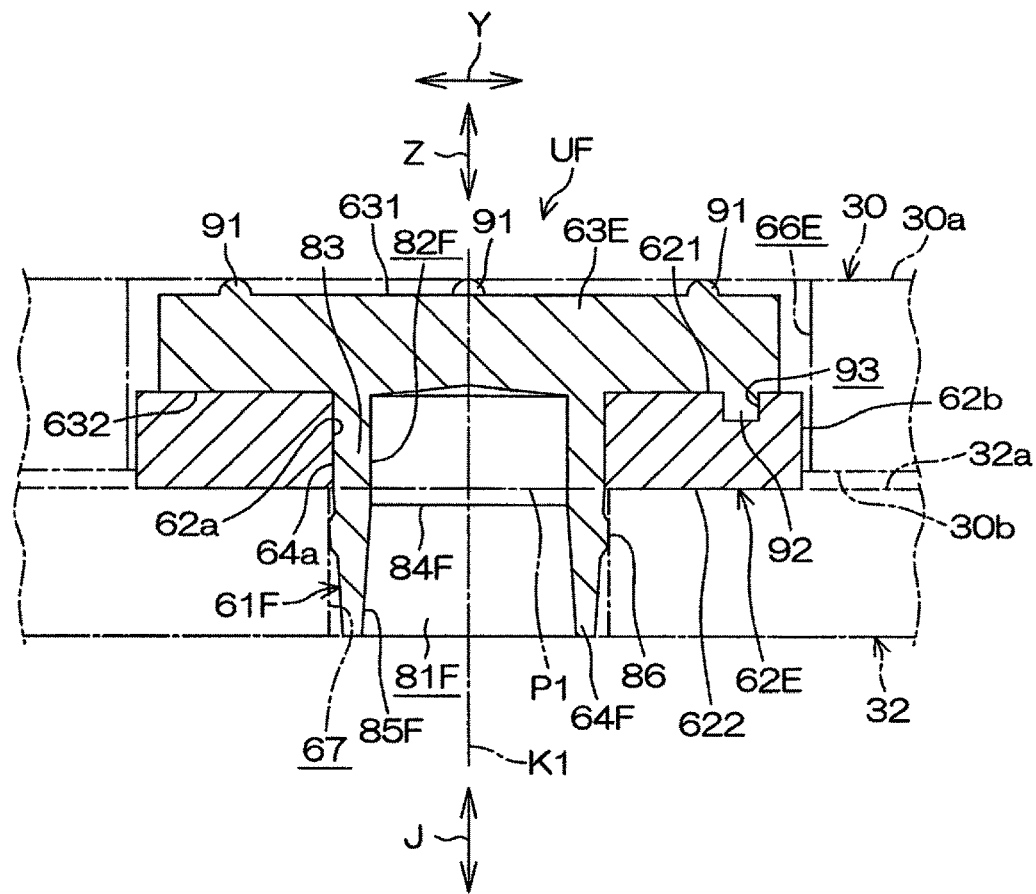
FIG. 12 is a partial cross-sectional view of a pin assembly including a resin pin and a collar according to a third embodiment of the invention, showing a cross-section in a left/right direction including an axis of the resin pin. A first plate and a second plate to be connected by the pin assembly are depicted by the imaginary lines.
Figure 13:
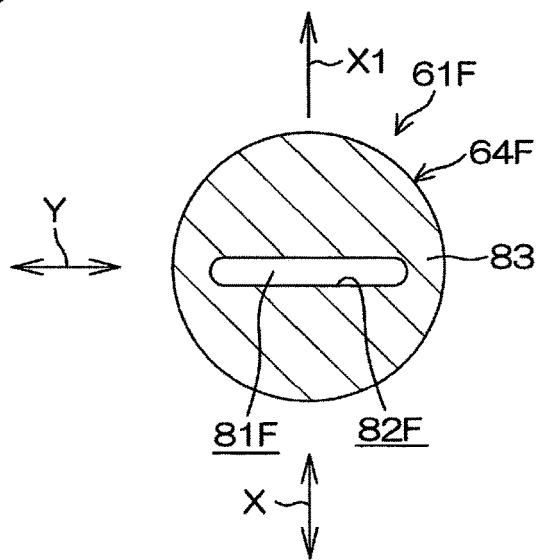
FIG. 13 is a cross-sectional view showing the resin pin whose straight portion has been cut off in the third embodiment.

FIG. 12 is a cross-sectional view of a pin assembly UF including a resin pin 61F and a collar 62E according to a third embodiment of the invention, showing a cross-section in a left/right direction including an axis K1 of a round shaft portion 64F of the resin pin 61F. The left/right direction in FIG. 12 corresponds to the left/right direction (direction Y perpendicular to a column moving direction X1) of a vehicle. FIG. 13 is a cross-sectional view of the resin pin 61F cut off in a straight portion 82F.

Refer to FIG. 12 and FIG. 13. The third embodiment has a major difference from the second embodiment in FIG. 9 as follows. That is, in the second embodiment, a plurality of hollow holes 81E each having a straight portion 82E whose cross-sectional shape is circular are provided as shown in FIG. 9.

On the other hand, in the third embodiment, as shown in FIG. 13, a single hollow hole 81F is provided, and the cross-sectional shape of the straight portion 82F of the hollow hole 81F is a long hole shape having a longitudinal direction nonparallel to a second direction X in a cross-section perpendicular to the axis of the round shaft portion 64F. For example, the longitudinal direction of the hollow hole 81F is a direction perpendicular to the second direction X (column moving direction X1).

As shown in FIG. 12, the inner circumference of the hollow hole 81F includes a straight portion 82F and a tapered portion 85F connected to the straight portion 82F through a boundary portion 84F.

Also in the third embodiment, the rotation of the resin pin 61F is regulated by a first insertion hole 66E through the collar 62E. Constituents of the third embodiment in FIG. 12 and FIG. 13 the same as those of the second embodiment in FIG. 9 are referenced correspondingly by the same reference signs as those of the constituents of the second embodiment in FIG. 9.

According to the third embodiment, the shape of the straight portion 82F of the hollow hole 81F is a long hole shape nonparallel to the second direction X (column moving direction X1) (for example, the shape of the hollow hole 81F is formed in advance into a flat shape deformed in the column moving direction X1). Thus, the deformation margin of the hollow hole 81F generated before the start of shearing can be reduced with respect to the second direction X (column moving direction X1). Therefore, the timing when a peak load of a shock absorption load appears can be made earlier. As a result, the shock absorption characteristic can be improved.

That is, in the third embodiment, the same peak load as the peak load PL of the shock absorption load (designated by the solid line) in the second embodiment can be made to appear at the same timing as the timing t2 in the second embodiment designed by the solid line in FIG. 11.

In addition, the single hollow hole 81F is used in the third embodiment. Therefore, a single core may be used for molding a resin pin. It is therefore easy to manufacture the resin pin 61F.

Fourth Embodiment

Figure 14:
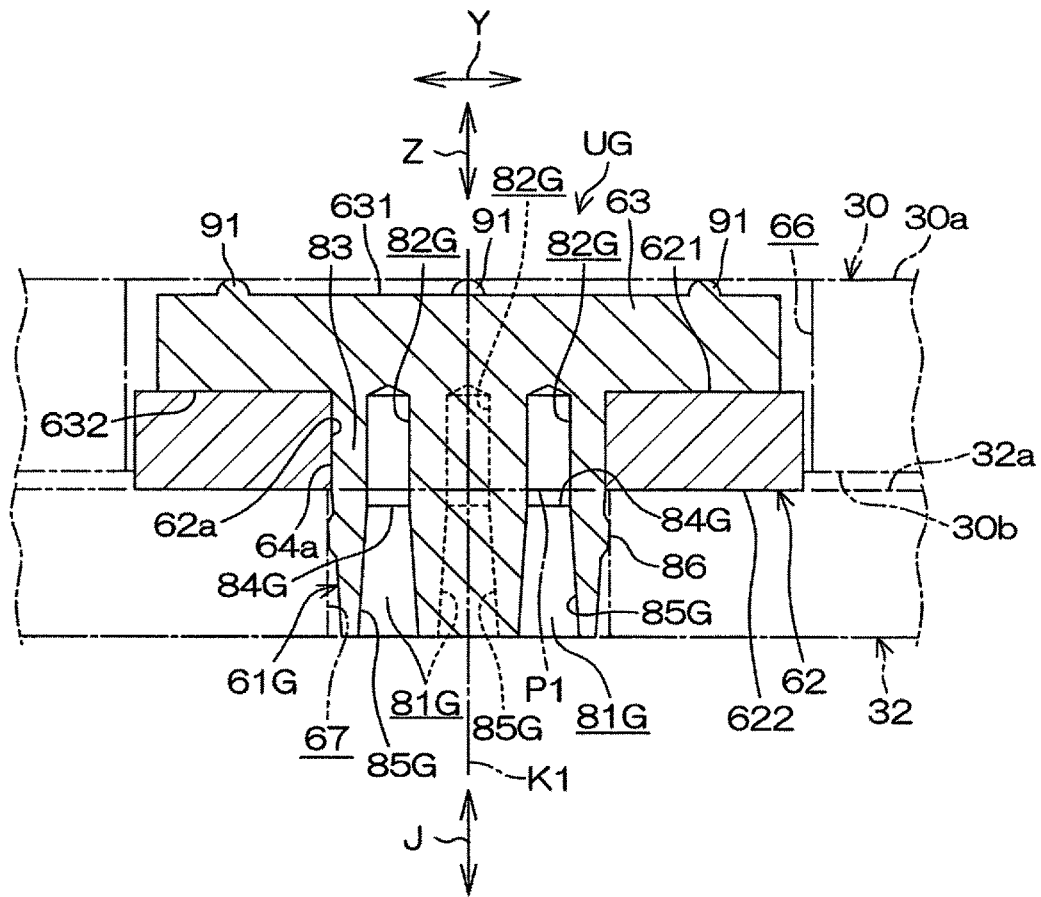
FIG. 14 is a partial cross-sectional view of a pin assembly including a resin pin and a collar according to a fourth embodiment of the invention, showing a cross-section in a left/right direction including an axis of the resin pin. A first plate and a second plate to be connected by the pin assembly are depicted by the imaginary lines.
Figure 15:
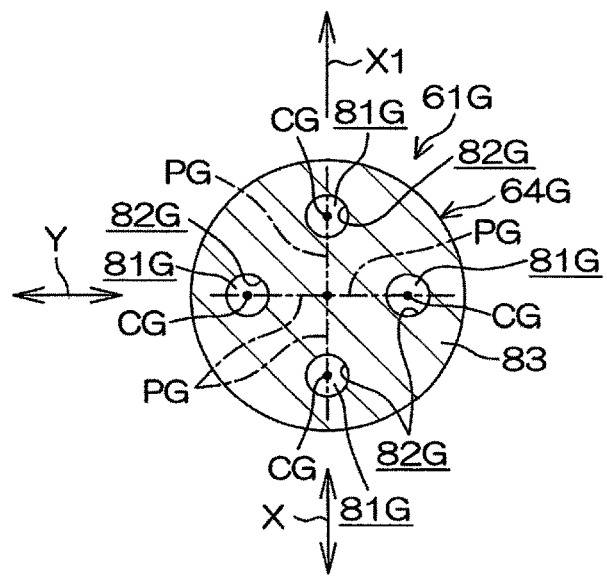
FIG. 15 is a cross-sectional view showing the resin pin whose straight portion has been cut off in the fourth embodiment.

FIG. 14 is a cross-sectional view of a pin assembly UG including a resin pin 61G and a collar 62 according to a fourth embodiment of the invention, showing a cross-section in a left/right direction including an axis K1 of a round shaft portion 64G of the resin pin 61G. The left/right direction in FIG. 14 corresponds to the left/right direction (direction Y perpendicular to a column moving direction X1) of a vehicle. FIG. 15 is a cross-sectional view of the resin pin 61G cut off in a straight portion 82G.

Refer to FIG. 14 and FIG. 15. The fourth embodiment has a major difference from the second embodiment in FIG. 9 and FIG. 10 as follows. That is, in the second embodiment, the two hollow holes 81E are used as shown in FIG. 10. However, in the fourth embodiment, four hollow holes 81G are used as shown in FIG. 15. Each hollow hole 81G includes a straight portion 82G, and a tapered portion 85G connected to the straight portion 82G through a boundary portion 84G. The cross-sectional shape of the straight portion 82G of each hollow hole 81G is circular. Central axes CG of the four hollow holes 81G may be disposed circumferentially at equal intervals on an arc around the center of the axis K1 of the round shaft portion 64G.

In the example of FIG. 15, of the four planes PG each including the central axis CG of each hollow hole 81G and the axis K1 of the round shaft portion 64G, the two planes PG arranged in the left/right direction (direction Y perpendicular to the column moving direction X1) are disposed in nonparallel to the second direction X, and the other two PG are arranged in the second direction X.

In the fourth embodiment, even when the second direction X (column moving direction X1) is set at any direction, at least two planes PG are nonparallel to the second direction X. The load direction (corresponding to the column moving direction X1) of a shock load in secondary collision can be set to be as desirable as possible, and the timing when a peak load of a shock absorption load appears can be made as early as possible.

That is, when the total cross-sectional area of the four hollow holes 81G in the fourth embodiment is made equal to the total cross-sectional area of the two hollow holes 81E in the second embodiment, the same peak load as the peak load PL of the shock absorption load (designated by the solid line) in the second embodiment can be made to appear at the same timing as the timing t2 in the second embodiment designed by the solid line in FIG. 11.

In addition, the rotation of each resin pin 61G around the axis K1 does not have to be regulated in the first insertion hole 66. As a result, assembling becomes easy.

Fifth Embodiment

Figure 16:
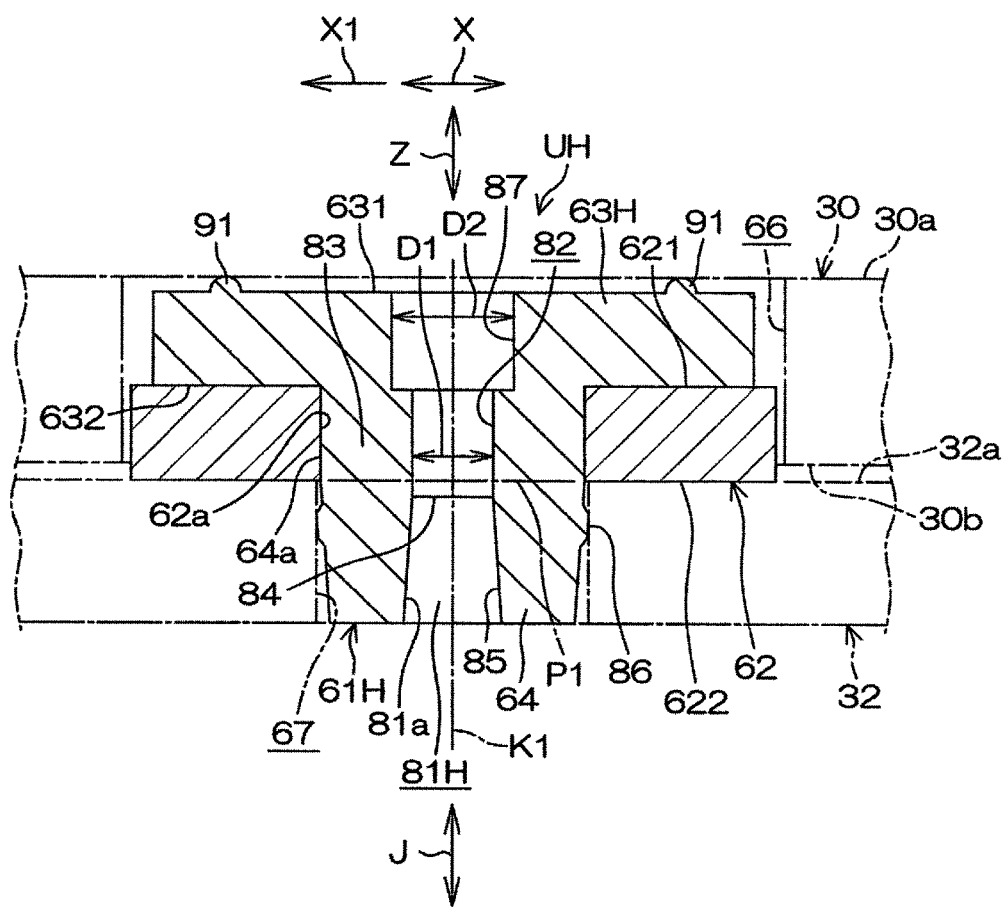
FIG. 16 is a partial cross-sectional view of a pin assembly including a resin pin and a collar according to a fifth embodiment of the invention, showing a cross-section in a front/rear direction including an axis of the resin pin. A first plate and a second plate to be connected by the pin assembly are depicted by the imaginary lines.

FIG. 16 is a cross-sectional view of a pin assembly UH including a resin pin 61H and a collar 62 according to a fifth embodiment of the invention, showing a cross-section in a left/right direction including an axis K1 of a round shaft portion 64 of the resin pin 61H. The left/right direction in FIG. 16 corresponds to the left/right direction (direction Y perpendicular to a column moving direction X1) of a vehicle.

Refer to FIG. 16. The fifth embodiment has a major difference from the first embodiment in FIG. 5 as follows. That is, in the pin assembly U1 according to the first embodiment, the hollow hole 81 is open only in an end face of the round shaft portion 64 as shown in FIG. 5. On the other hand, in the pin assembly UH according to the fifth embodiment, as shown in FIG. 16, the hollow hole 81H is a through hole penetrating the resin pin 61H in an axial direction J of the round shaft portion 64, and the hollow hole 81H is also open in a first face 631 of a head portion 63H.

In the example of FIG. 16, the hollow hole 81H includes a communication portion 87 extending from a straight portion 82 in the opposite direction to a tapered portion 85 and opened in the first face 631 of the head portion 63H. The inner diameter D2 of the communication portion 87 may be larger than the inner diameter D1 of the straight portion 82 (D2>D1). Alternatively, the inner diameter D2 may be equal to the inner diameter D1 of the straight portion 82 (D2=D1).

Constituents of the fifth embodiment in FIG. 16 the same as those of the first embodiment in FIG. 5 are referenced correspondingly by the same reference signs as those of the constituents of the first embodiment in FIG. 5.

The hollow hole 81H can be visually recognized from any one of the opposite side portions of the resin pin 61H. Accordingly, for example, resin pins 61H having a plurality of specifications and including hollow holes 81H different in specifications from one another (the number of hollow holes, the cross-sectional shape of each hollow hole, the inner diameter of each hollow hole, etc.) can be distinguished easily.

In addition, the outer diameter of the round shaft portion 64 in the case where the hollow hole 81H is a through hole as in the fifth embodiment in FIG. 16 may differ from the outer diameter of the round shaft portion 64 in the case where the hollow hole 81 is not a through hole as in the first embodiment in FIG. 5. On this occasion, two kinds of specifications can be distinguished based on whether a hollow hole is a through hole or not.

In this manner, specifications of a resin pin can be distinguished easily based on visual recognition of presence/absence of penetration of a hollow hole. Thus, wrong assembling of resin pins can be prevented as much as possible.

Incidentally, the hollow holes 81E in the second embodiment in FIG. 9, the hollow hole 81F in the third embodiment in FIG. 12, and the hollow holes 81G in the fourth embodiment in FIG. 14 may be formed as through holes respectively.

The invention is not limited to any aforementioned embodiment. For example, a plurality of pin assemblies arrayed in a single row arranged in the column moving direction X1 may be provided. In addition, various changes may be made on the invention within the scope of the claims thereof.

The present invention is based on a Japanese patent application (Japanese Patent Application No. 2013-269516) filed on Dec. 26, 2013, the contents of which are incorporated herein by reference.

DESCRIPTION OF REFERENCE SKINS

1: Steering Device
2: Steering Member
3: Steering Shaft
13: Vehicle Body Side Member
15: Steering Column
16: Upper Jacket (Movable Jacket)
23: Fixed Bracket
24: Tilt Bracket (Movable Bracket)
25: Suspension Bolt (Suspension Shaft)
26: Column Bracket
27: Operation Lever
28: Fastening Shaft
29: Lock Mechanism
30, 30E: First Plate
32: Second Plate
32a: Reception Surface
61, 61E, 61F, 61G, 61H: Resin Pin
62, 62E: Collar
62a: Inner Circumference
62b: Outer Circumference
622: Second End Face
63, 63E, 63H: Head Portion
64, 64E, 64F, 64G: Round Shaft Portion
64a: Outer Circumference
66, 66E: First Insertion Hole
67: Second Insertion Hole
81, 81E, 81F, 81G, 81H: Hollow Hole
81a: Inner Circumference
82, 82E, 82F, 82G: Straight Portion
84, 84E, 84F, 84G: Boundary Portion
85, 85E, 85F, 85G: Tapered Portion
86: Diameter Expansion Portion
87: Communication Portion
92: Rotation Regulation Protruding Portion
93: Rotation Regulation Recess Portion
CE, CG: Central Axis (of Hollow Hole)
J: Axial Direction (of Round Shaft Portion)
K1: Axis (of Round Shaft Portion),
P1: Shear Plane PE, PG: Plane (including Central Axis of Hollow Hole and Axis of Round Shaft Portion)
PL: Peak Load
T1, T2: Suspension Mechanism
U1, UE, UF, UG, UH: Pin Assembly
X: Second Direction
X1: Column Moving Direction
Z: First Direction

The invention claimed is:

1. A pin assembly adaptable for absorbing the shock of a secondary collision of a vehicle when inserted in a steering column of said vehicle comprising:
   a resin pin which is an injection molded piece and which comprises a round shaft portion, the round shaft portion being inserted into a first insertion hole and a second insertion hole in a first direction to connect a first plate and a second plate with each other in a second direction perpendicular to the first direction, the round shaft portion being sheared to cancel connection between the first plate and the second plate upon secondary collision of a vehicle, the first insertion hole and the second insertion hole being respectively provided in the first plate and the second plate opposing each other in the first direction; and
   a collar which comprises an inner circumference fitted to an outer circumference of the round shaft portion and terminating at an end face received by a reception surface of the second plate, which has higher hardness than the resin pin, which is received in the first insertion hole, and which shears the round shaft portion in a shear plane along the end face upon the secondary collision,
   wherein the round shaft portion comprises at least one hollow hole which is provided around an axis of the round shaft portion as a center, and which extends in an axial direction of the round shaft portion, and
   wherein an inner circumference of the hollow hole comprises:
      a straight portion which has a generating line parallel to the axial direction of the round shaft portion and which is traversed by a plane comprising the end face of the collar; and
      a tapered portion which is provided for release from a mold and which is connected to the straight portion through a boundary portion disposed at a position separated from the end face of the collar in the axial direction of the round shaft portion, and
   wherein the shear plane intersects the straight portion of the hollow hole.

2. The pin assembly according to claim 1,
   wherein a plurality of the hollow holes is provided, and
   wherein a plane comprising a central axis of at least one of the plurality of hollow holes and the axis of the round shaft portion is nonparallel to the second direction.

3. The pin assembly according to claim 1,
   wherein in a cross-section perpendicular to the axis of the round shaft portion, a shape of the hollow hole is a long hole shape having a longitudinal direction nonparallel to the second direction.

4. The pin assembly according to claim 1,
   wherein the resin pin comprises a head portion which is provided at one end of the round shaft portion and which has a diameter larger than the round shaft portion, and
   wherein the outer circumference of the round shaft portion comprises a diameter expansion portion that is press-fitted into the second insertion hole at a position avoiding a radially outer side of the straight portion.

5. The pin assembly according to claim 1,
   wherein the hollow hole penetrates the resin pin.

6. A steering device comprising the pin assembly according to claim 1.

* * * * *